(12) United States Patent
Rehan et al.

(10) Patent No.: US 10,117,089 B2
(45) Date of Patent: Oct. 30, 2018

(54) QUALITY OF EXPERIENCE AWARE MULTIMEDIA ADAPTIVE STREAMING

(71) Applicant: INTEL IP CORPORATION, Santa Clara, CA (US)

(72) Inventors: Mohamed Rehan, Cairo (EG); Rana Morsi, Cairo (EG); Ozgur Oyman, Palo Alto, CA (US)

(73) Assignee: Intel IP Corporation, Santa Clara, CA (US)

( * ) Notice: Subject to any disclaimer, the term of this patent is extended or adjusted under 35 U.S.C. 154(b) by 84 days.

(21) Appl. No.: 14/768,298

(22) PCT Filed: Mar. 18, 2014

(86) PCT No.: PCT/US2014/030967
§ 371 (c)(1),
(2) Date: Aug. 17, 2015

(87) PCT Pub. No.: WO2014/160553
PCT Pub. Date: Oct. 2, 2014

(65) Prior Publication Data
US 2016/0014184 A1  Jan. 14, 2016

Related U.S. Application Data

(60) Provisional application No. 61/806,821, filed on Mar. 29, 2013.

(51) Int. Cl.
*G06F 13/00* (2006.01)
*H04W 8/08* (2009.01)
(Continued)

(52) U.S. Cl.
CPC .............. *H04W 8/082* (2013.01); *H04B 1/56* (2013.01); *H04B 7/0417* (2013.01);
(Continued)

(58) Field of Classification Search
CPC ........ H04L 47/822; H04L 47/10; H04L 47/00; G06F 11/008; G06F 2209/503
(Continued)

(56) References Cited

U.S. PATENT DOCUMENTS

2011/0082924 A1   4/2011  Gopalakrishnan
2012/0030723 A1   2/2012  Baum et al.
(Continued)

FOREIGN PATENT DOCUMENTS

CN   102763396 A   10/2012
CN   102812683 A   12/2012
(Continued)

OTHER PUBLICATIONS

Rehan, et al; "On SAND CE: Proposed Metrics for Server-Client Signaling Interface", 107. MPEG Meeting; Jan. 13, 2014-Jan. 17, 2014; San Jose; XP030060778.
(Continued)

*Primary Examiner* — Kenneth R Coulter
(74) *Attorney, Agent, or Firm* — Thorpe North & Western

(57) ABSTRACT

Technology to provide quality of experience aware multimedia streaming is disclosed. In an example, a server operable to provide hyper-text transfer protocol (HTTP) adaptive streaming, can include computer circuitry configured to: determine a bandwidth available to the server for transmitting HTTP adaptive streaming content to a plurality of clients; receive HTTP requests from the plurality of clients for representations offered by the server in a manifest file for the HTTP adaptive streaming; and calculate an availability of each representation that is offered in the manifest file for the server. The availability can be calculated, at least in part, based on the determined bandwidth. The availability of each representation can be communicated from the server to the plurality of clients.

26 Claims, 9 Drawing Sheets

(51) Int. Cl.

| | |
|---|---|
| H04L 5/00 | (2006.01) |
| H04B 1/56 | (2006.01) |
| H04B 7/06 | (2006.01) |
| H04W 76/15 | (2018.01) |
| H04W 48/16 | (2009.01) |
| H04W 36/30 | (2009.01) |
| H04W 24/00 | (2009.01) |
| H04W 36/26 | (2009.01) |
| H04W 48/18 | (2009.01) |
| H04B 7/0417 | (2017.01) |
| H04W 36/00 | (2009.01) |
| H04W 36/22 | (2009.01) |
| H04L 1/18 | (2006.01) |
| H04W 24/02 | (2009.01) |
| H04W 72/04 | (2009.01) |
| H04W 72/08 | (2009.01) |
| H04W 28/20 | (2009.01) |
| H04L 29/06 | (2006.01) |
| H04M 1/725 | (2006.01) |
| H04W 4/021 | (2018.01) |
| H04W 8/02 | (2009.01) |
| H04W 8/06 | (2009.01) |
| H04W 28/02 | (2009.01) |
| H04W 76/02 | (2009.01) |
| H04W 48/06 | (2009.01) |
| H04N 21/24 | (2011.01) |
| H04N 21/845 | (2011.01) |
| H04N 21/8543 | (2011.01) |
| H04B 7/0452 | (2017.01) |
| H04B 7/08 | (2006.01) |
| H04W 56/00 | (2009.01) |
| H04W 36/08 | (2009.01) |
| H04W 48/12 | (2009.01) |
| H04W 88/08 | (2009.01) |
| H04W 84/04 | (2009.01) |
| H04W 88/10 | (2009.01) |
| H04W 84/12 | (2009.01) |
| H04W 88/02 | (2009.01) |
| H04W 28/08 | (2009.01) |
| H04L 25/03 | (2006.01) |

(52) U.S. Cl.
CPC ........... *H04B 7/0452* (2013.01); *H04B 7/063* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 56/001* (2013.01); *H04W 72/0446* (2013.01); *H04W 72/082* (2013.01); *H04W 76/025* (2013.01); *H04W 76/15* (2018.02); *H04L 5/0007* (2013.01); *H04L 2025/03426* (2013.01); *H04W 28/085* (2013.01); *H04W 36/08* (2013.01); *H04W 48/12* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/23* (2018.01); *Y02D 70/444* (2018.01)

(58) Field of Classification Search
USPC ........ 709/235, 233, 232, 231, 230, 226, 203
See application file for complete search history.

(56) References Cited

U.S. PATENT DOCUMENTS

| | | | |
|---|---|---|---|
| 2012/0084454 A1 | 4/2012 | Lindquist et al. | |
| 2012/0259994 A1 | 10/2012 | Gillies et al. | |
| 2012/0311174 A1 | 12/2012 | Bichot et al. | |
| 2013/0042015 A1 | 2/2013 | Begen et al. | |
| 2014/0108495 A1* | 4/2014 | Benno | H04N 21/23406 709/203 |
| 2014/0109153 A1* | 4/2014 | Venkatraman | H04N 21/2343 725/62 |
| 2014/0149557 A1* | 5/2014 | Lohmar | H04L 65/605 709/219 |
| 2014/0280781 A1* | 9/2014 | Gregotski | H04L 65/60 709/219 |

FOREIGN PATENT DOCUMENTS

| | | |
|---|---|---|
| CN | 102823223 A | 12/2012 |
| TW | 201304480 A | 1/2013 |
| TW | 201306616 A | 2/2013 |
| WO | WO 2013/004260 A1 | 1/2013 |
| WO | WO 2013/017165 A1 | 2/2013 |

OTHER PUBLICATIONS

Oyman, et al. "Quality of Experience for HTTP Adaptive Streaming Services", IEEE Communications Magazine; Apr. 2012.

Raf, et al; "Session reconstruction for HTTP adaptive streaming—Laying the foundation for network-based QoE monitoring", IEEE 2012.

International Search Report for PCT/US2014/030967 dated Jul. 9, 2014.

Taiwan search report from foreign office action dated Jan. 16, 2016, in TW Application No. 103111028, filed Mar. 25, 2014; 2 pages.

* cited by examiner

| Representation ID | Representation Bitrate (kbits/sec.) | Representation access bit (RAB) |
|---|---|---|
| 0 | 1500 | $B_5$ |
| 1 | 2200 | $B_4$ |
| 2 | 2400 | $B_3$ |
| 3 | 3000 | $B_2$ |
| 4 | 3200 | $B_1$ |
| 5 | 3600 | $B_0$ |

FIG. 4

| Available Bandwidth (kbits/sec.) | Available Representation Code (ARC) |
|---|---|
| 7000 | 111111 |
| 3000 | 111100 |
| 2200 | 110000 |

FIG. 5

QUALITY OF EXPERIENCE AWARE MULTIMEDIA ADAPTIVE STREAMING

RELATED APPLICATIONS

This application claims the benefit of and hereby incorporates by reference U.S. Provisional Patent Application Ser. No. 61/806,821, filed Mar. 29, 2013.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates a table that provides an example of an MPD file with available representations in accordance with an example;

FIG. 5 illustrates a table that provides an example of an available representation code for selected server bandwidths in accordance with an example;

Figure 1:
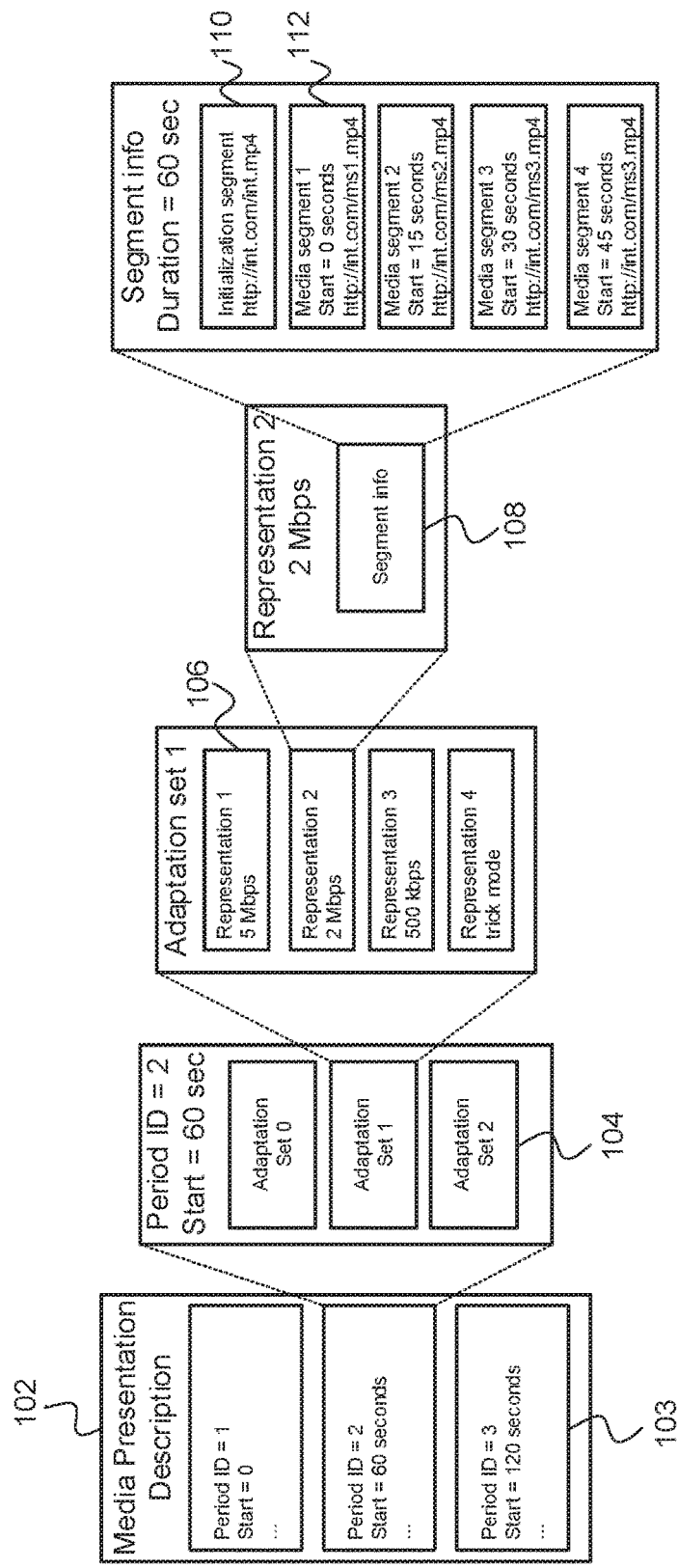
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Adaptive multimedia streaming allows different versions of the same multimedia file to be accessed by a mobile device while the multimedia is being streamed. Changes in radio link conditions can reduce or increase the available bandwidth at the mobile device. The ability to "adapt" by changing to different versions of the multimedia file while the file is performed at the mobile device enables the performance to continue even when decreases in bandwidth occur.

Current adaptive multimedia streaming standards and specifications, including hyper-text transfer protocol (HTTP) based streaming services, such as progressive download and dynamic adaptive streaming over HTTP (DASH), have limitations which can reduce the quality of experience of users in certain conditions.

It is typically assumed that all multimedia servers that are included in a streaming file's Manifest file include all versions and portions of the multimedia. This means that servers that have partial content of a multimedia stream cannot be used to stream the periods they do not have to a mobile device. In the event that a specific server, having all of the versions and periods of a multimedia stream, become overloaded and are unable to deliver content in a proper time frame, there is no way to inform the mobile device to reduce its download rate from the server to avoid potential retrieval delay of portions of the multimedia or large packet loss.

In addition, in the event that the mobile devices share a common limited bandwidth and contend for resources, it is likely that the presence of several multimedia streams to multiple users will cause congestion and reduce the playback experience by causing the mobile devices to refill their buffers before the playback can continue. This can be especially true for live events, when a large number of users may attempt to fetch the same multimedia streaming content from a server.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and records video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards may be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP).

HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2A:
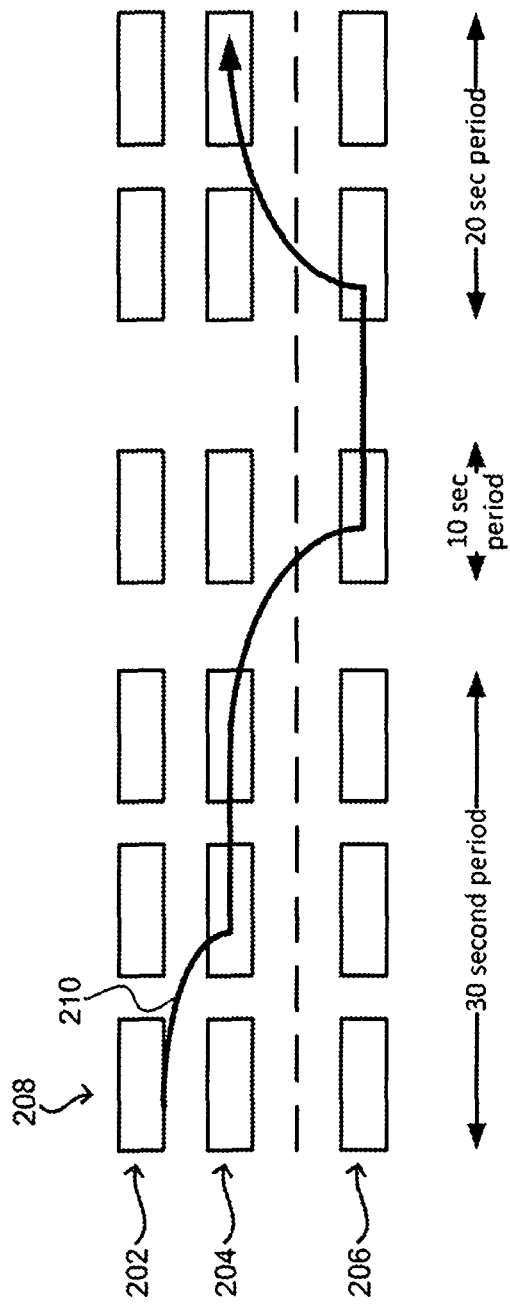
FIG. 2a illustrates an example of a hypertext transfer protocol (HTTP) adaptive stream (HAS) that varies over time in accordance with an example.
Figure 2B:
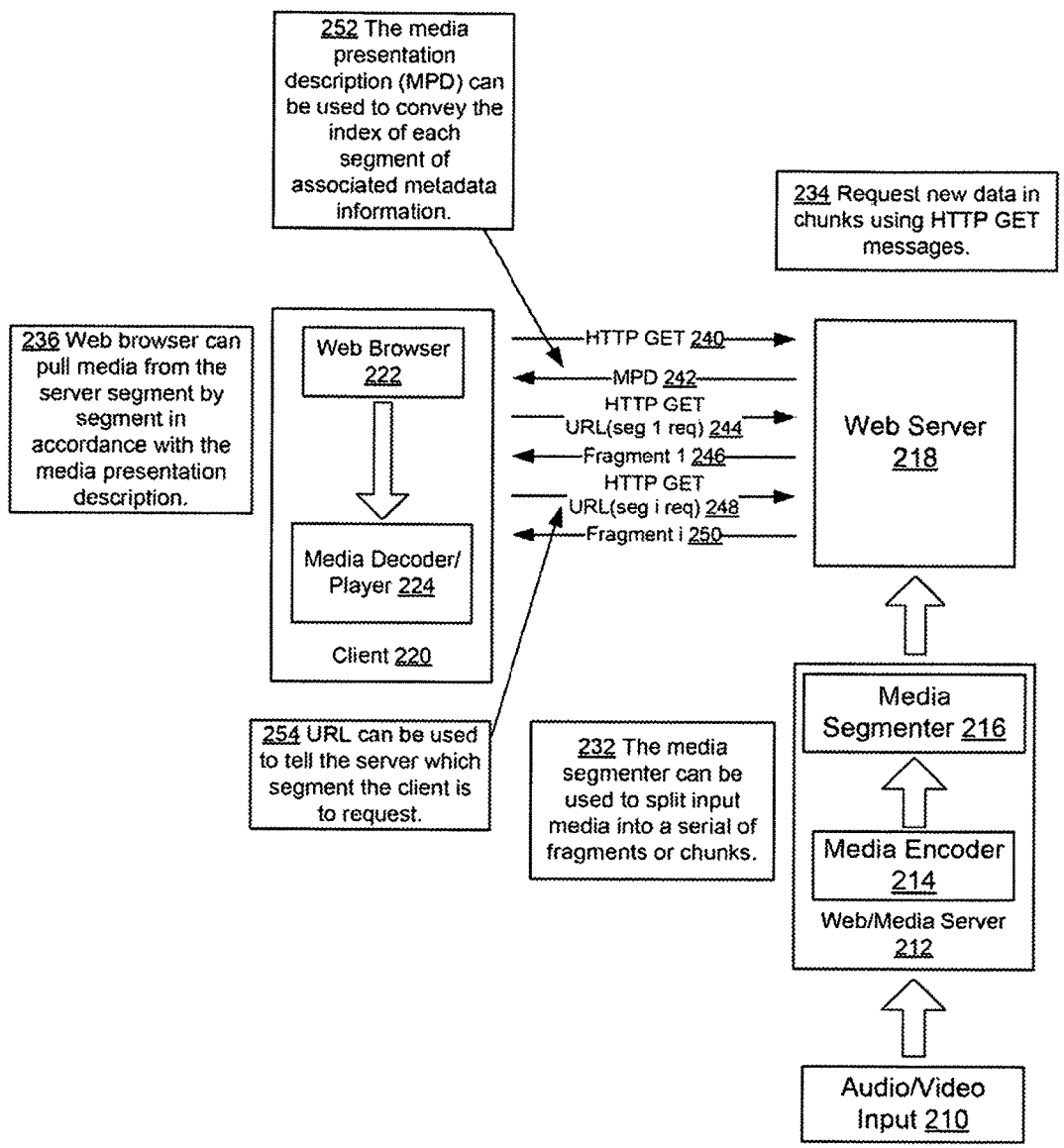
FIG. 2b illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2b. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs may be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

FIG. 2a provides an example illustration of an HTTP adaptive stream (HAS) 210 that varies over time. In a first 30 second period, a client first retrieves segments 208 from a high quality representation 202. The segments in this example are approximately 10 seconds long. However, this is not intended to be limiting. Segments can be configured to be any desired length at the server. In addition, sub-segments can also be downloaded.

The client then retrieves two segments in a medium quality representation 204. In a second period of 10 seconds duration, the client switches again and retrieves segments from a low quality representation 206. The client may switch to the lower quality representation due to changes in radio link quality with the multimedia server. In a third period of 20 seconds duration, the client switches back to the medium quality representation 204, as illustrated in FIG. 2a. The client can continue to request segments from a selected representation throughout the length of the HAS of the multimedia file from a server to a client operating on a multimedia device.

As shown in FIG. 2b, the MPD metadata information can be communicated to a client 220. The client can operate on a mobile device. A mobile device can be a wireless device configured to receive and display streaming media. In one embodiment, the Mobile device may only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2b illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL (frag 1 req) 244. A uniform resource locator (URL) or universal resource locator can be used to tell the web server which segment the client is to request 254. The web server can provide the first fragment (i.e., segment 1 246). For subsequent segments, the web browser can request a segment i using a HTTP GET URL (frag i req) 248, where i is an integer index of the segment. As a result, the web server can provide a segment i 250. The segments can be presented to the client via a media decoder/player 224.

Figure 3:
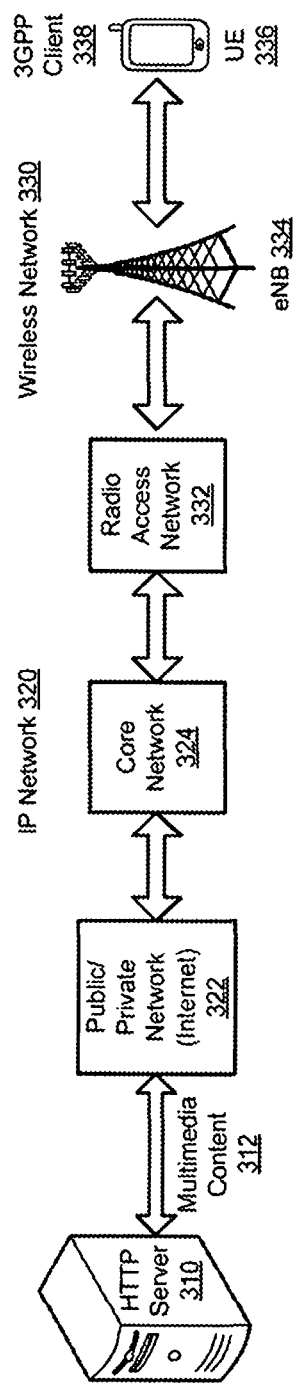
FIG. 3 illustrates a block diagram of an energy characterization-aware radio access network (RAN) architecture for hypertext transfer protocol-based (HTTP-based) video streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network (i.e. Rel. 11 or 12) or an IEEE 802.16 based network (i.e. 802.16-2009 or 802.16m-2011). The core network can access a wireless network 330, such as an evolved packet system (EPS) via a radio access network (RAN) 332. The RAN can provide the multimedia content to the client operating on the UE via a node (e.g., an evolved Node B (eNB) 334).

QoE Aware Adaptive Streaming

The Quality of Experience (QoE) of HTTP adaptive streaming (HAS) can be affected by the one or more servers hosting the representations and the corresponding segments. As previously discussed, the current specification assumes that all servers (base uniform resource locator (URL)) each include all of the representations and the corresponding segments. This means that servers that only have partial contents cannot be listed in the MPD file. If servers with partial content are listed in the MPD file, the client will not be able to determine that those servers don't' have certain representations or segments until a request is made and not fulfilled from a specific server. When this occurs, the client QoE can drop sharply due to a delay in retrieving missing segments.

Servers can have a limited operational capacity. If a specific server becomes overloaded and is unable to deliver content in a proper time frame, there is no way for the server to inform one or more clients operating on the mobile device to reduce its download rate from the server to avoid potential segment retrieval delay or large packet loss.

In addition, servers can have limited bandwidth. When multiple clients share the common limited bandwidth and contend for resources, it is likely that the presence of several DASH streams to multiple users will cause congestion and reduce the playback experience at the clients. A reduced ability to provide segments by a server can lead to undesired rebuffering at the clients. This can be especially true for events where a large number of clients are attempting to fetch the same DASH content from a server.

In accordance with an embodiment of the present invention, a server can modify a set of DASH representations offered to clients in a manifest file, such as an MPD. The modification can enable the server to communicate, to a client, information such as the available representations and/or segments, the available server capacity, and/or the available server bandwidth or throughput. A client can then request representations that are actively available. If another server with a greater capacity or bandwidth is not available, the client can select a representation or segment that will not overload the available server capacity and bandwidth.

A server typically communicates supported base URL sites comprising a server internet protocol (IP) address, such as <Base URL>http://192.168.10.10/sintel/,/Base URL>. In addition to the server IP address, a binary code corresponding to each representation can be included that indicates if a selected representation is available at the server or not. For example, representation availability may be communicated using a binary code referred to as an available representation code (ARC). The communication from the server can include the ARC message, such as: <Base URL arc="0011001111">http://192.168.10.10/sintel/</BaseURL>. This will be discussed more fully in the proceeding paragraphs.

The ability to communicate the availability of a representation can enable a server to dynamically notify clients with updated binary code for available representations. This binary code can be used by the server to limit client requests to representations that will tax the server's capability and/or throughput. A client can include the updated binary codes in its bitrate adaptation logic and request only representations within the actively available list. The feedback mechanism allows clients that are served by the server to make decisions which will help avoid congestion issues at the server, thereby increasing the QoE at the client device by reducing rebuffering events and increasing the representation level that can be communicated to the client.

Available Representation Code

In accordance with an embodiment, a binary code, such as the ARC, can be predetermined for each representation in a manifest file, such as an MPD file. In one example, each ARC can assign a bit, referred to as a representation access bit (RAB), which can either be '0' or '1' for each representation. At run time, the server can compute the server's upload rate for the streaming media that is being served to the clients and dynamically update the ARC, which is then used to notify each client accordingly.

FIG. 4 provides a table that illustrates an example of an MPD file with available representations. In this example, the MPD file includes six different representations, labeled with representation identification (ID) 0-5. Each representation has a different bitrate. In this example ID 0 has the lowest bitrate and ID 5 has the highest bitrate, as measured in kilobits per second (Kbits/sec). Each representation ID is also assigned an RAB, with representation ID 0 assigned to RAB $B_5$ and ID 5 assigned to RAB $B_0$, as shown. Alternative arrangements are also possible, as can be appreciated.

Since the example MPD file contains 6 representations, the corresponding ARC can include 6 bits or RAB comprising ($B_5 B_4 B_3 B_2 B_1 B_0$). In this example implementation, the most significant bit corresponds to the representation with the lowest bitrate and vice versa. This example is not intended to be limiting. A number of different types of codes can be used to communicate the ARC from the server to each client.

FIG. 5 provides an example table of ARC codes that are used to show selected available bandwidth rates at the server. As can be seen, for each representation at the server, when the corresponding available representation bit is set to a selected binary value, such as '0', the representation access by the client is disabled. When the available representation bit is set to the opposite binary value, such as '1', the representation access is enabled. This allows each client to know which representations are available to the client.

In the examples in the preceding paragraphs, a code is used to communicate which representations are available at a server. The code is communicated in each MPD file. However, the code may be communicated in other ways at a desired frequency depending on how quickly changes in server bandwidth or server capacity occur in a HAS system.

In a further example, during a streaming session, the server and client can perform a set of operations to increase the QoE by each client. The server can receive feedback information from each client to compute the bandwidth to be allocated for each user. The feedback information can contain the average quality perceived by the user and the number of re-buffering events experienced by the client during the HAS session. In one embodiment, the quality perceived by the user can be a pre-calculated quality factor that is associated with each segment and roughly estimates a mean opinion score (MOS) that will be achieved. This pre-calculated quality factor can be included in the manifest file, such as the MPD. The algorithms used for bandwidth allocation will be further discussed in the proceeding paragraphs.

The server can dynamically modify the ARC so that the download rate of one or more clients does not exceed a maximum supported bandwidth rate by the server, or a maximum supported rate by a specific client. The server can then transmit the updated ARC to the user through a response to user HTTP requests. Examples of communicating the ARC information include transmitting the ARC information in the manifest file, such as an MPD, transmitting the ARC information in a custom HTTP header, transmitting the ARC information via a separate radio channel than a radio channel used to communicate the HAS, or transmitting the ARC via higher layer signaling. The client can then receive the ARC and use the information in the client's bit rate adaptation algorithm when making subsequent requests.

The operations described in the preceding paragraphs enable a server to manage the quality of experience for the users. Additional operations can be performed to optimize the QoE in selected ways. A number of examples for optimizing user experience are provided below.

Minimum Quality Reduction Approach

Dynamically adjusting the ARC at the server can allow for a minimization of significant drops in quality on a per user basis. Higher priority can be given to users who will experience a bigger drop in quality in the case where a representation is deactivated (i.e. a RAB for a representation is changed from '1' to '0').

A number of additional factors can be taken into account. For example, the number of re-buffering events for each client can be determined. A difference between each client's average quality and the average quality of all users combined can be determined. These factors can then be used as credit that can be given to a client. The credit can reduce the possibility of further representation deactivation for the client. Accordingly, a client with a lower QoE than average can have their QoE raised relative to other clients.

In one embodiment, a minimum quality reduction (MQR) algorithm can begin by enabling all representations for all clients. In an iterative manner, the MQR algorithm can search for the client that will experience the least drop in quality when a representation is deactivated. In each round, if a client has credit points then the client is eliminated as a potential candidate for representation deactivation in that round and his credit is reduced by one. The rounds can continue until the server achieves a desired drop in bandwidth or capacity. When the server has excess bandwidth or capacity, the MQR algorithm can activate representations first for clients with the most credit points.

Same Average Quality Approach

In this example embodiment, all clients can be set to approximately the same average quality. The server can check whether the total bandwidth requested by the combined set of clients exceeds the bandwidth that is available to the server. If the requested bandwidth does exceed the available bandwidth to the server for HAS, a representation can be deactivated for the client with the highest average quality. The average quality can be calculated by each client and sent to the server.

As previously discussed, a MOS value can be calculated in a pre-processing phase and included within a manifest file, such as the MPD. Each segment in the MPD is associated with this MOS value. Segments with higher data rates have MOS values that are greater than are equal to MOS values of Segments with lower data rates. There are currently efforts to standardize this quality information as a parameter in the MPD for the DASH specification. While downloading the HAS, each client can update the average quality, which can be derived from a sum of each MOS value for a downloaded Segment divided by the number of downloaded segments in the HAS.

In one embodiment, the client's average quality can be replaced with the quality corresponding to the average quality of the maximum representation permissible to the client. The server can then check the total bandwidth requested again and continue to iteratively deactivate representations for clients with the highest average quality until the maximum total bandwidth that can be requested by the combined set of clients that are served by the server is less than or equal to the bandwidth available to the server for HAS. Conversely, if the server detects that the total bandwidth requested by the clients is less than the total bandwidth available to the server for HAS, then additional representations can be activated for the clients with the lowest average quality.

Additional algorithms can be developed and used by the server to provide a desired QoE to the clients that are served by the server by adjusting which representations are available to each client and communicating the availability information to each client at a desired frequency.

QoE Aware Server

Figure 6:
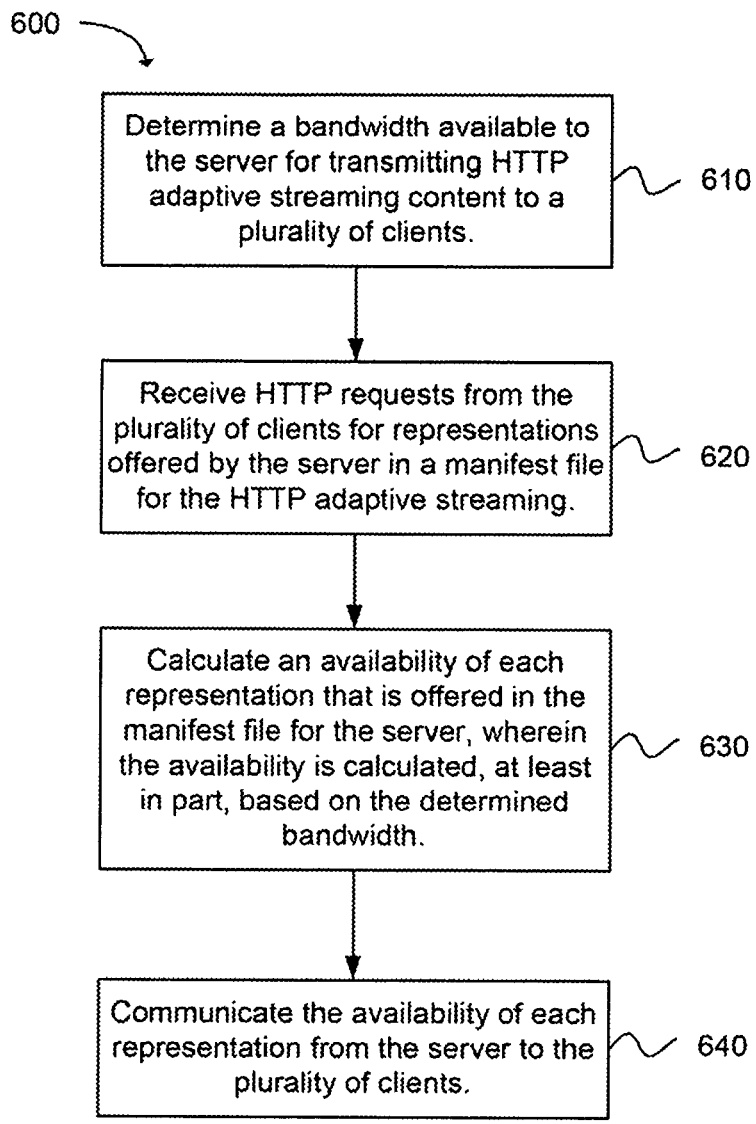
FIG. 6 depicts functionality of computer circuitry of a server operable to provide HTTP adaptive streaming in accordance with an example.

Another example provides functionality 600 of computer circuitry of a server operable to provide hyper-text transfer protocol (HTTP) adaptive streaming; as shown in the flow chart in FIG. 6. The functionality may he implemented as a method or the functionality may be executed as instructions on a machine, where the instructions are included on at least one computer readable medium or one non-transitory machine readable storage medium. The computer circuitry can be configured to determine a bandwidth available to the server for transmitting HTTP adaptive streaming content to a plurality of clients, as in block 610. The computer circuitry can also be further configured to receive HTTP requests from the plurality of clients for representations offered by the server in a manifest file for the HTTP adaptive streaming, as in block 620. The computer circuitry can be further configured to calculate an availability of each representation that is offered in the manifest file for the server, wherein the availability is calculated, at least in part, based on the determined bandwidth, as in block 630. In addition, the computer circuitry can be configured to communicate the availability of each representation from the server to the plurality of clients, as in block 640.

In one embodiment, the computer circuitry can be configured to communicate the availability of each representation as a maximum download rate to each of the plurality of clients, to configure each client to request representations having a bitrate that is less than the maximum download rate. In another embodiment, the computer circuitry can be configured to communicate the availability of each representation as a representation access bit (RAB) for each representation in the manifest file. The computer circuitry can communicate the RAB for each representation as an available representation code (ARC), wherein the ARC is communicated in response to an HTTP request from a client for the representation.

In one embodiment, the computer circuitry can Communicate the RAB for each representation as an available representation code (ARC), wherein the ARC is communicated via a separate radio channel than a radio channel used to communicate the HAS or in a custom HTTP header. In another embodiment, the ARC can be communicated with a most significant bit corresponding to a representation with a lowest bitrate. Alternatively, the ARC can be communicated based on an agreement between the server and each client. In another embodiment, the ARC can be embedded in the manifest file for each server to signal each available representation at that server, thereby allowing each server to store representations at different bitrates.

The computer circuitry can be further configured to receive quality of experience (QOE) information from each of the plurality of clients receiving HTTP adaptive streaming from the server; and calculate the availability of each representation for each client based on the determined bandwidth and the QOE for each of the plurality of clients. The QOE information received from each of the plurality of clients can be in the form of statistics sent by the streaming clients such as an average download rate, an average requested rate, a number of buffering events, a stalling time, a number of representation switches, an average quality, as previously discussed, or another desired metric that can be used to identify a quality of the HAS at the client.

In another embodiment, the computer circuitry can be configured to enable all of the representations for each of the plurality of clients; iteratively disable representations for selected clients based on the QOE received for each client, wherein representations are disabled for a client in the plurality of clients that will experience a lowest drop in QOE relative to other clients in the plurality of clients; and continue the iterative disablement of representations until the available bandwidth is sufficient to transmit the HTTP adaptive streaming content to the plurality of clients with close qualities.

The computer circuitry can be configured to calculate a credit score for each of the plurality of clients based, at least in part, on: a number of rebuffering events for the received HTTP adaptive stream; and a difference between each client's average quality and an average combined quality of the plurality of clients; and perform the iterative disablement of representations in rounds. When a client has credit points, the client can be eliminated as a candidate for deactivation of a representation in a round and the client's credit score is reduced by a selected value. In another embodiment, the computer circuitry can be configured to perform the iterative disablement of representations for a client in the plurality of clients that has a highest average quality of experience; and continue to perform the iterative disablement of representations for each client with the highest average quality of experience until the available bandwidth is sufficient to transmit the HTTP adaptive streaming content to the plurality of clients.

In one example, the computer circuitry can further be configured to calculate the availability of each representation for each client based on the determined bandwidth and the QOE for each of the plurality of clients using a selected load balancing algorithm.

QoE Aware Mobile Device

Figure 7:
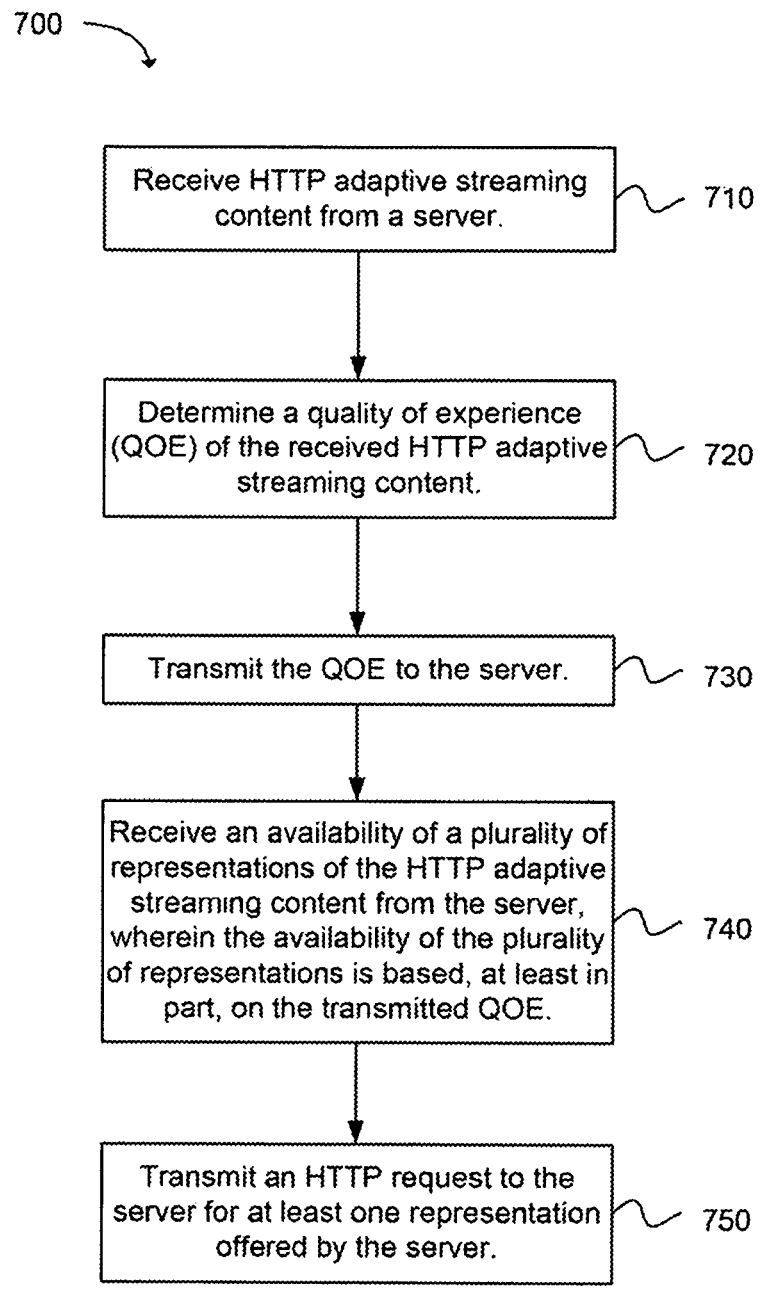
FIG. 7 depicts functionality of computer circuitry of a mobile device operable to provide HTTP adaptive streaming in accordance with an example.

Another example provides functionality 700 of computer circuitry of a mobile device operable to provide hyper-text transfer protocol (HTTP) adaptive streaming, as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to receive HTTP adaptive streaming content from a server, as in block 710. The computer circuitry can be further configured to determine a quality of experience (QOE) of the received HTTP adaptive streaming content, as in block 720. The QoE can be the average MOS value, as previously discussed. The average MOS value is typically based on the download content. However, QoE can be extended to be a combination of other statistics, such as the average download rate, average requested rate, number of buffering events, stalling time, number of representation switches, average quality (previously described), or other desired metrics. These factors may be combined to produces a single value that represents the QoE.

The computer circuitry can be further configured to transmit the QOE to the server, as in block 730. In addition, the computer circuitry can be configured to receive an availability of a plurality of representations of the HTTP adaptive streaming content from the server, wherein the availability of the plurality of representations is based, at least in part, on the transmitted QOE, as in block 740, and transmit an HTTP request to the server for at least one representation offered by the server, as in block 750.

The computer circuitry of the mobile device can be further configured to transmit the HTTP request to the server in a manifest file for the HTTP adaptive streaming content. In one embodiment, the manifest file can be a media presentation description for a dynamic adaptive streaming over HTTP (DASH) adaptation set.

In another embodiment, the computer circuitry can be configured to receive the HTTP adaptive streaming content and the IMP adaptive streaming content is formatted as a dynamic adaptive streaming over HTTP (DASH) format.

The computer circuitry can be further configured to receive the availability of each representation of the HTTP adaptive streaming content as a representation access bit (RAB) for each representation. In another embodiment, the RAB for each representation can be received as an available representation code (ARC), wherein the ARC is received in response to the transmitted HTTP request from the mobile device for the representation. In one embodiment, the ARC can be received with a least significant bit corresponding to a representation with a highest bitrate and a most significant bit corresponding to a representation with a lowest bitrate. Alternatively, the ARC can be used in a bitrate adaptation algorithm when making subsequent HTTP requests for representations of the HTTP adaptive streaming content.

In addition, the computer circuitry can be configured to determine the QOE based, at least in part, on a number of rebuffering events that have occurred at the mobile device while receiving the HTTP adaptive streaming content.

Method for Providing Variable Bitrate Adaptive Streaming

Figure 8:
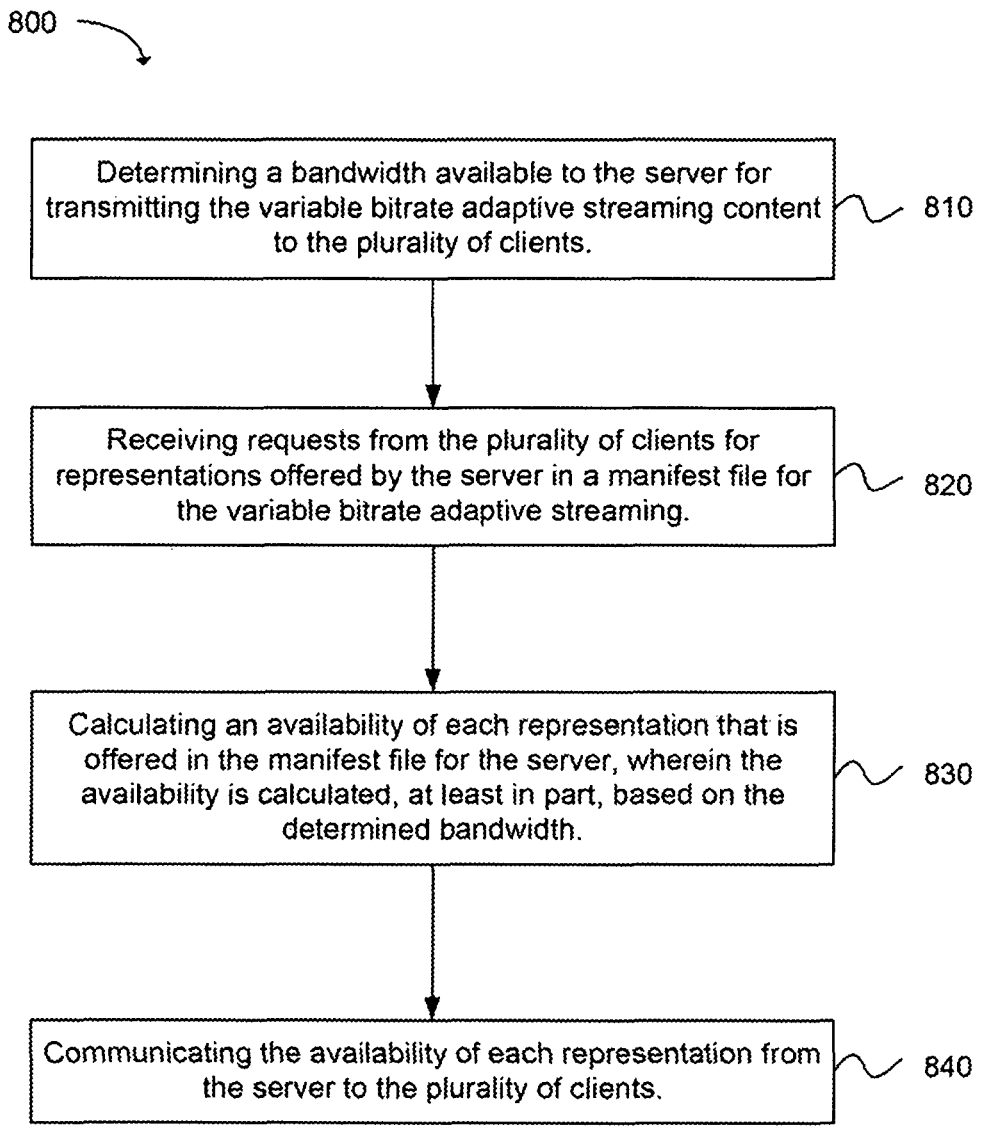
FIG. 8 illustrates a block diagram of a method for providing variable bitrate adaptive streaming of multimedia from a server to a plurality of clients in accordance with an example.

Another example provides a method 800 for providing variable bitrate adaptive streaming of multimedia from a server to a plurality of clients, as shown in the flow chart in FIG. 8. The method may be executed as instructions on a machine, computer circuitry, or a processor for the server, where the instructions are included on at least one computer readable medium or one non-transitory machine readable storage medium. The method includes the operation of determining a bandwidth available to the server for transmitting the variable bitrate adaptive streaming content to the plurality of clients, as in block 810. An additional operation of the method is receiving requests from the plurality of clients for representations offered by the server in a manifest file for the variable bitrate adaptive streaming, as in block 820. A further operation of the method is calculating an availability of each representation that is offered in the manifest file for the server, as in block 830. The availability can be calculated, at least in part, based on the determined bandwidth. An additional operation of the method comprises communicating the availability of each representation from the server to the plurality of clients, as in block 840.

The method 800 can further comprise communicating the availability of each representation as a maximum download rate to each of the plurality of clients to configure each client to request representations having a bitrate less than the maximum download rate. Alternatively, the availability of each representation can be communicated as a representation access bit (RAB) for each representation in the manifest file. The RAB for each representation can be communicated as an available representation code (ARC). In one embodiment, the ARC can be communicated in response to a request from a client for the representation. Alternatively, the ARC code can be communicated via a separate radio channel than the radio channel used to communicate the variable bitrate streaming or in a custom hyper-text transfer protocol (HTTP) header. For example, the ARC may be received in a custom HTTP header in an HTTP response packet for downloaded segments.

Figure 9:
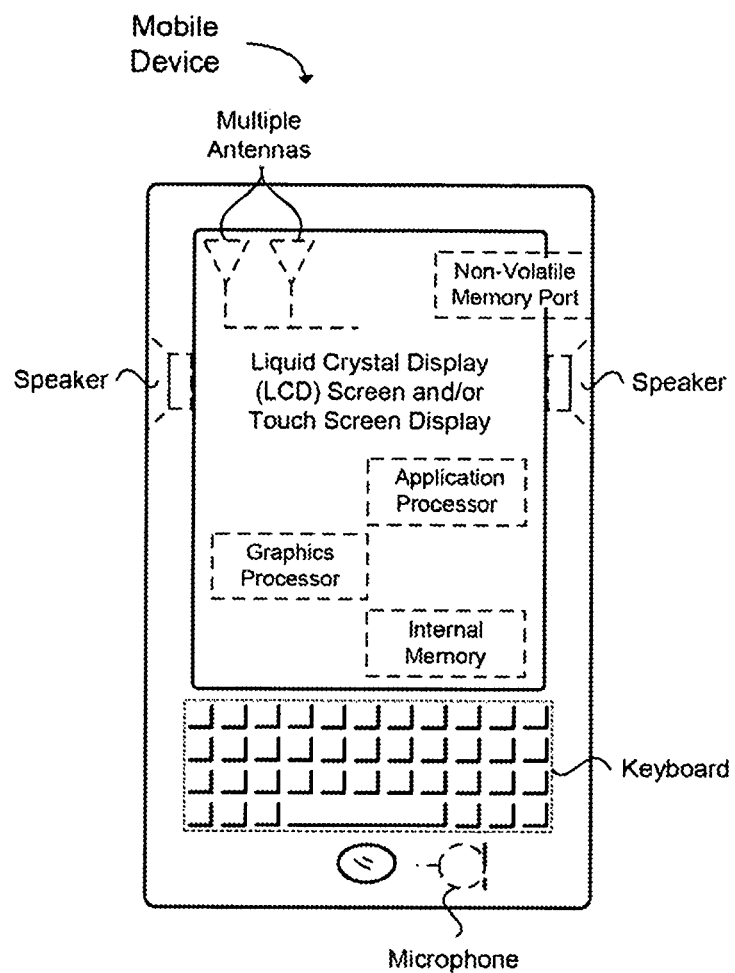
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. While examples are provided of a mobile wireless device, the device does not necessarily need to be wireless. A wired device can also be used for HAS.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different, code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A server operable to provide hyper-text transfer protocol (HTTP) adaptive streaming, the server comprising:
   memory; and a processor coupled to the memory, configured to:
      determine a bandwidth available to the server for transmitting HTTP adaptive streaming content to a plurality of clients;

receive HTTP requests from the plurality of clients for representations offered by the server in a manifest file for the HTTP adaptive streaming stored in the memory;

calculate an availability of each representation that is offered in the manifest file for the server, wherein the availability is calculated, at least in part, based on the determined bandwidth; and communicate the availability of each representation from the server to the plurality of clients as a maximum download rate to each of the plurality of clients, to configure each client to request the representations from the server having a bitrate less than the maximum download rate.

2. The server of claim 1, wherein the processor coupled to the memory is further configured to communicate the availability of each representation as a representation access bit (RAB) for each representation in the manifest file.

3. The server of claim 2, wherein the processor coupled to the memory is further configured to communicate the RAB for each representation as an available representation code (ARC), wherein the ARC is communicated in response to an HTTP request from a client for the representation.

4. The server of claim 2, wherein the processor coupled to the memory is further configured to communicate the RAB for each representation as an available representation code (ARC), wherein the ARC is communicated via a separate radio channel than a radio channel used to communicate the HAS or in a custom HTTP header.

5. The server of claim 3, wherein the ARC is communicated with a most significant bit corresponding to a representation with a lowest bitrate.

6. The server of claim 3, wherein the ARC is communicated based on an agreement between the server and each client.

7. The server of claim 3, wherein the ARC is embedded in the manifest file for each server to signal each available representation at that server, thereby allowing each server to store representations at different bitrates.

8. The server of claim 1, wherein the processor coupled to the memory is further configured to:

receive quality of experience (QOE) information from each of the plurality of clients receiving HTTP adaptive streaming from the server; and calculate the availability of each representation for each client based on the determined bandwidth and the QOE for each of the plurality of clients.

9. The server of claim 8, wherein the processor coupled to the memory is further configured to:

enable all of the representations for each of the plurality of clients;

iteratively disable representations for selected clients based on the QOE received for each client, wherein representations are disabled for a client in the plurality of clients that will experience a lowest drop in QOE relative to other clients in the plurality of clients; and continue the iterative disablement of representations until the available bandwidth is sufficient to transmit the HTTP adaptive streaming content to the plurality of clients with close qualities.

10. The server of claim 9, wherein the processor coupled to the memory is further configured to:

calculate a credit score for each of the plurality of clients based, at least in part, on:

a number of rebuffering events for the received HTTP adaptive stream; and a difference between each client's average quality and an average combined quality of the plurality of clients; and perform the iterative disablement of representations in rounds, wherein when a client has credit points, the client is eliminated as a candidate for deactivation of a representation in a round and the client's credit score is reduced by a selected value.

11. The server of claim 9, wherein the processor coupled to the memory is further configured to:

perform the iterative disablement of representations for a client in the plurality of clients that has a highest average quality of experience; and continue to perform the iterative disablement of representations for each client with the highest average quality of experience until the available bandwidth is sufficient to transmit the HTTP adaptive streaming content to the plurality of clients.

12. The server of claim 9, wherein the processor coupled to the memory is further configured to calculate the availability of each representation for each client based on the determined bandwidth and the QOE for each of the plurality of clients using a selected load balancing algorithm.

13. A mobile device operable to provide hyper-text transfer protocol (HTTP) adaptive streaming, the mobile device comprising:

memory; and a processor coupled to the memory configured to:

receive HTTP adaptive streaming content from a server;

determine a quality of experience (QOE) of the received HTTP adaptive streaming content;

transmit the QOE to the server;

receive an availability of a plurality of representations of the HTTP adaptive streaming content from the server, wherein the availability of the plurality of representations is based, at least in part, on the transmitted QOE; and transmit an HTTP request to the server for at least one representation offered by the server as a maximum download rate to each of a plurality of clients, to configure each client to request the representations from the server having a bitrate less than the maximum download rate.

14. The mobile device of claim 13, wherein the memory and processor are further configured to transmit the HTTP request to the server for the HTTP adaptive streaming content.

15. The mobile device of claim 14, wherein the manifest file is a media presentation description for a dynamic adaptive streaming over HTTP (DASH) adaptation set.

16. The mobile device of claim 13, wherein the memory and processor are further configured to receive the HTTP adaptive streaming content and the HTTP adaptive streaming content is formatted as a dynamic adaptive streaming over HTTP (DASH) format.

17. The mobile device of claim 13, further configured to receive the availability of each representation of the HTTP adaptive streaming content as a representation access bit (RAB) for each representation.

18. The mobile device of claim 17, wherein the ARC is received with a least significant bit corresponding to a representation with a highest bitrate and a most significant bit corresponding to a representation with a lowest bitrate.

19. The mobile device of claim 17, wherein the ARC is received in a custom hyper-text transfer protocol (HTTP) header in an HTTP response packet for downloaded segments.

20. The mobile device of claim 17, wherein the memory and processor are further configured to use the ARC in a bitrate adaptation algorithm when making subsequent HTTP requests for representations of the HTTP adaptive streaming content.

21. The server of claim 17, wherein the memory and processor are further configured to receive the RAB for each representation as an available representation code (ARC), wherein the ARC is received in response to the transmitted HTTP request from the mobile device for the representation.

22. The mobile device of claim 13, further configured to determine the QOE based, at least in part, on a number of rebuffering events that have occurred at the mobile device while receiving the HTTP adaptive streaming content.

23. A method for providing variable bitrate adaptive streaming of multimedia from a server to a plurality of clients, comprising:
   determining a bandwidth available to the server for transmitting the variable bitrate adaptive streaming content to the plurality of clients;
   receiving requests from the plurality of clients for representations offered by the server in a manifest file for the variable bitrate adaptive streaming;
   calculating an availability of each representation that is offered in the manifest file for the server, wherein the availability is calculated, at least in part, based on the determined bandwidth; and
   communicating the availability of each representation from the server to the plurality of clients as a maximum download rate to each of the plurality of clients, to configure each client to request the representations from the server having a bitrate less than the maximum download rate.

24. The method of claim 23, further comprising communicating the availability of each representation as a representation access bit (RAB) for each representation in the manifest file.

25. The method of claim 23, further comprising communicating the RAB for each representation as an available representation code (ARC), wherein the ARC is communicated in response to the request from a client for the representation.

26. The method of claim 23, further comprising communicating the RAB for each representation as an available representation code (ARC), wherein the ARC is communicated via a separate radio channel than a radio channel used to communicate the variable bitrate streaming or in a custom hyper-text transfer protocol (HTTP) header.

* * * * *